United States Patent [19]
Garter et al.

[11] Patent Number: 5,090,184
[45] Date of Patent: Feb. 25, 1992

[54] HARVESTING UNIT HEIGHT CONTROL FOR A COTTON HARVESTER

[75] Inventors: Lee F. Garter, Western Springs; Jesse H. Orsborn, Hinsdale; Kevin S. Richman, Darien; Joel Soto, Maywood, all of Ill.

[73] Assignee: J. I. Case Company, Racine, Wis.

[21] Appl. No.: 628,208

[22] Filed: Dec. 14, 1990

[51] Int. Cl.$^5$ .................. A01D 46/08; A01D 46/20; A01D 67/00; A01D 75/28

[52] U.S. Cl. .................. 56/10.2; 56/28; 56/208; 56/DIG. 10; 56/DIG. 11

[58] Field of Search .................. 56/10.2, 10.4, 28, 36, 56/DIG. 10, DIG. 11, DIG. 15

[56] References Cited

U.S. PATENT DOCUMENTS

| | | | |
|---|---|---|---|
| 3,176,777 | 4/1965 | Bowie | 56/208 X |
| 3,196,599 | 7/1965 | Meiners et al. | 56/208 X |
| 3,417,553 | 12/1968 | Hubbard | 56/208 X |
| 3,566,587 | 3/1971 | Janssen | 56/208 X |
| 3,611,681 | 10/1971 | Blanton et al. | 56/10.4 |
| 3,925,971 | 12/1975 | Goering et al. | 56/208 |
| 4,229,931 | 10/1980 | Schlueter et al. | 56/10.2 |
| 4,809,487 | 3/1989 | Junge et al. | 56/28 X |

OTHER PUBLICATIONS

J. I. Case Corporation (822-1844 Cotton Picker) Operator's Manual, 05/1986, p. 73.

Primary Examiner—Stephen J. Novosad
Attorney, Agent, or Firm—Dressler, Goldsmith, Shore, Sutker & Milnamow, Ltd.

[57] ABSTRACT

A system for controlling the elevation of a harvesting unit of a cotton harvester relative to a ground surface. The control system includes a valve assembly whose position controls operation of a lift mechanism connected to the harvesting unit and which is operated by a ground contour sensor assembly carried by the harvesting unit. Harvesting unit elevation is correlated with the extent that the ground contour sensor assembly moves relative to the harvesting unit. The ground contour sensor assembly includes a shoe with a ground engaging surface wherein such surface is movable vertically relative to the harvesting unit and also is pivotable sideways about a fore-and-aft extending axis thereby enhancing ground contact of the sensor assembly with the ground contour.

9 Claims, 2 Drawing Sheets

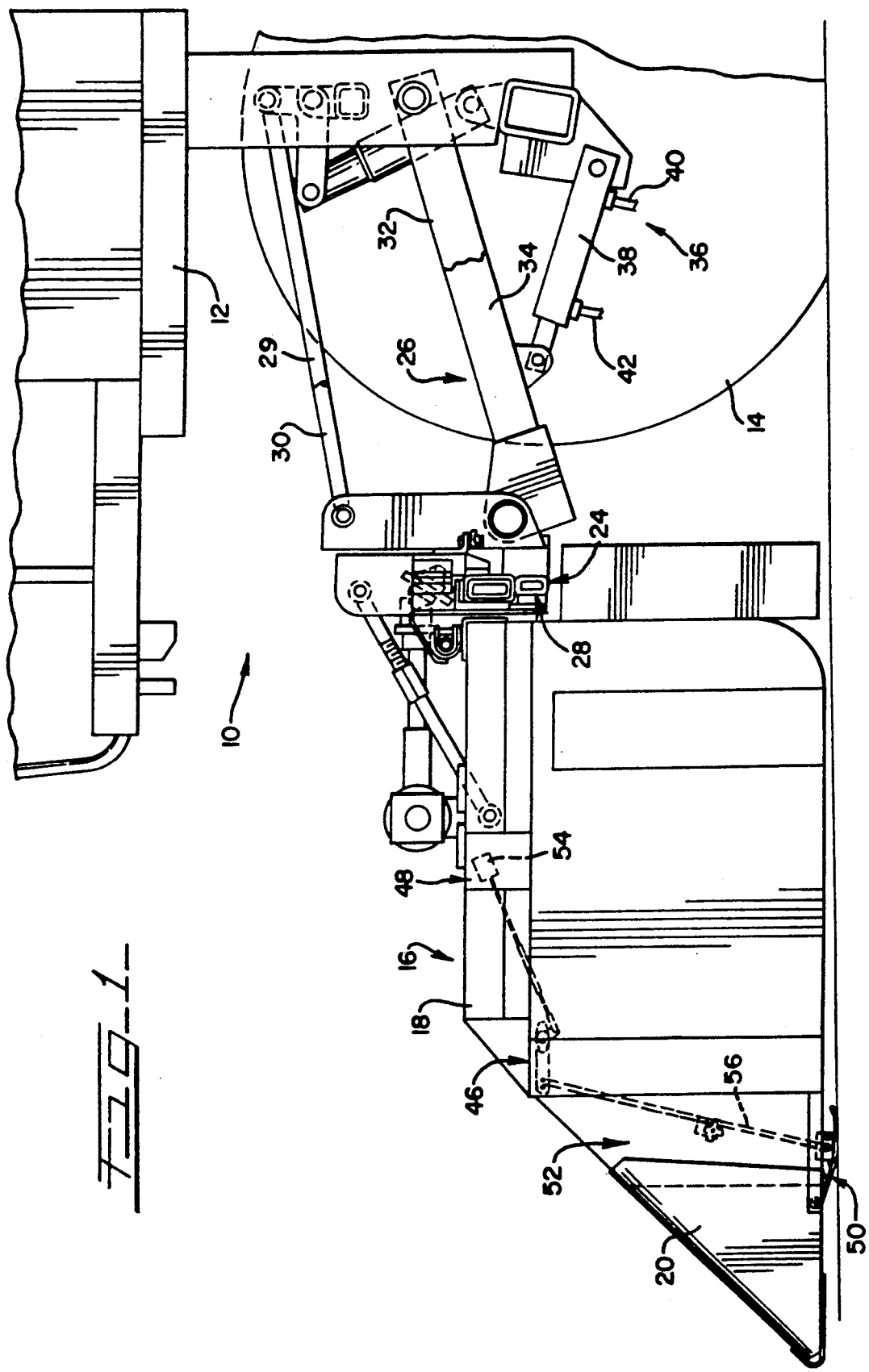

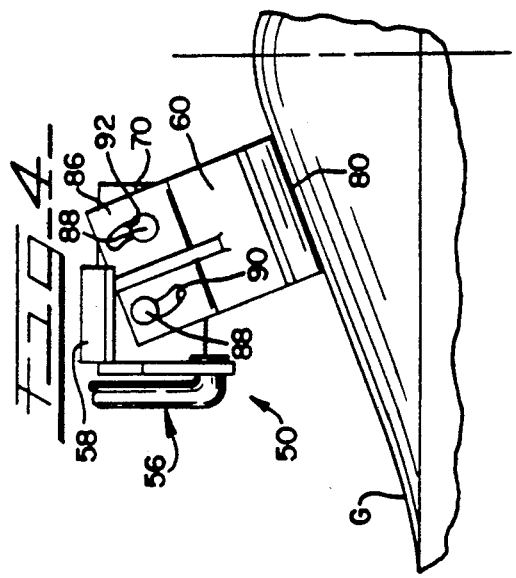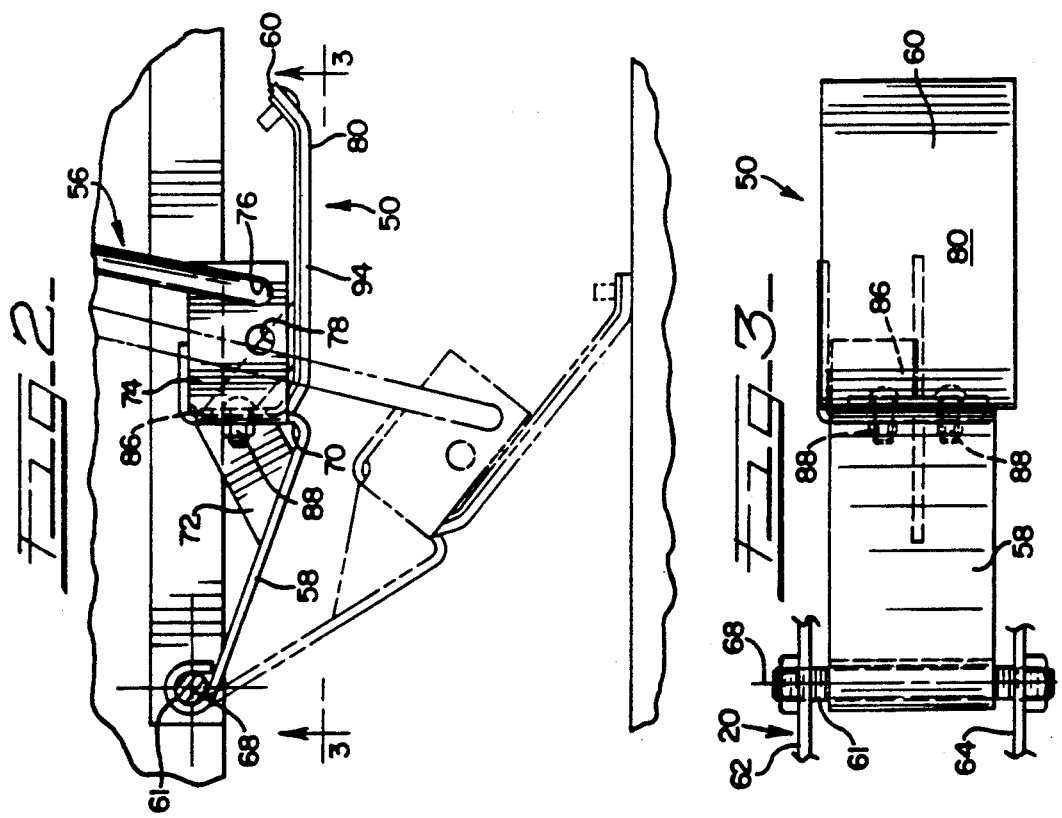

HARVESTING UNIT HEIGHT CONTROL FOR A COTTON HARVESTER

FIELD OF THE INVENTION

The present invention generally relates to cotton harvesters and, more particularly, to a ground contour sensing shoe for use with a harvesting unit height control system for a cotton harvester.

BACKGROUND OF THE INVENTION

Conventional cotton harvesters include harvesting units commonly supported for vertical movement on a fore-and-aft wheeled frame of the harvester. Each harvesting unit includes a housing assembly defining a plant passage and a harvesting mechanism arranged within the housing. As the cotton harvester is driven across the cotton field, a row of cotton plants passes through the passage and the harvesting mechanism removes the cotton therefrom.

Cotton grows substantially along the entire height of the cotton plant. At the lower end, the cotton grows barely off the ground and sometimes on the ground. The harvesting units, therefor, follow as close to the ground as possible so as to pick all of the cotton from the plant.

The ground over which the harvester is driven is usually uneven. Accordingly, if the harvesting unit is set for a lowermost depression on the ground, the stalk lifters extending from a forward end of the harvesting unit will tend to "dig into" high points on the ground contour. As the harvester is driven across the field, the wheels on the harvester frame ride between adjacent rows of cotton plants. In softer muddy conditions, the wheels of the harvester deform the field into slight recesses or valleys and raised ridges. As will be appreciated, proper positioning of the harvesting unit relative to the ground contour is further more complicated in such undulating field conditions.

To optimize efficiency during the harvesting operation, cotton harvesters are known to include a harvesting unit height adjusting system for automatically controlling the height of the harvesting unit relative to the ground. The elevation of the harvesting unit is primarily controlled by a lift mechanism actuated in accordance with ground contours. Variations of the ground contour are sensed by a ground engaging element, such as a shoe, mounted on the harvesting unit in a manner to press on the ground and be positionally displaced in response to variations of the ground contour profile. The sensing shoe of the height adjustment system is connected as by a linkage assembly to a control valve of a hydraulic system connected to the lift mechanism. The control valve controls operation of the lift mechanism and thereby elevation of the harvesting units.

The shoe or sensing element of the height adjustment system defines a ground engaging surface extending generally parallel to a flat ground surface. As the harvester is driven across the field, the sensing shoe moves over and is in contact with the ground. As will be appreciated, a lateral edge of the sensing shoe tends to "dig into" the sides of raised ridges in the cotton fields. The abrasiveness of the ground surface contact coupled with the weight of a linkage mechanism connected thereto and the concentrated contact with the ground causes the ground engaging lateral edge of the shoe to quickly wear resulting in attendant and undesirable consequences.

SUMMARY OF THE INVENTION

In view of the above, and in accordance with the present invention, there is provided a system for controlling the elevation of a harvesting unit of a cotton harvester relative to a ground surface over which the harvester is moved. The control system includes a valve assembly whose position controls operation of a lifting mechanism connected to the harvesting unit and which is operated by a ground contour sensor carried by the harvesting unit. Harvesting unit elevation is correlated to the extent that the ground contour sensor vertically moves relative to the harvesting unit. The ground contour sensor includes a shoe with a ground engaging surface defined thereby. In addition to being vertically moveable, the sensing shoe has a pivotal mount allowing pivotal sideways movement of the shoe about a fore-and-aft extending axis thereby enhancing ground contact of the shoe with the ground surface.

The cotton harvester has a pressurized hydraulic system having supply and return portions. In a preferred form of the invention, the lift mechanism includes a hydraulic cylinder connected to the supply and return portions of the hydraulic system for adjusting the elevation of the harvesting unit.

The valve assembly is arranged in combination with the hydraulic system for regulating flow of pressurized hydraulic fluid through the supply and return portions to influence operation of the lift mechanism and thereby the elevation of the harvesting unit as a function of the position of a valve arranged for reciprocal movement relative to a predetermined position. The ground contour sensor positions the valve relative to its predetermined location and thereby operates the lift mechanism to correlate harvesting unit elevation to the extent that the sensor vertically moves relative to the harvesting unit.

In a preferred form of the invention, the ground engaging shoe is connected to a mounting bracket which defines a first pivotal mount arranged toward a forward end thereof and which allows for vertical movement of the bracket and shoe about a first axis. To facilitate operation of the system, the mounting bracket defines fore-and-aft spaced apertures for alternatively accommodating linkage which connects the ground contour sensor to the valve of the valve assembly.

The shoe is fastened to the mounting bracket at a second pivotal mount defining a second axis extending generally normal to the first axis to allow for alternate horizontal movement of the ground engaging surface. The ground engaging surface of the shoe of the sensing assembly preferably has metallic, synthetic material to improve the wear characteristics thereof. In a most preferred form, the ground engaging shoe has an interchangeable wear plate connected thereto which defines a ground engaging surface thereon.

A salient feature of the present invention concerns the ability of the shoe on the ground engaging sensor to pivotally move about a fore-and-aft extending axis thereby enhancing ground contact between the shoe and the ground surface. The ability of the shoe to horizontally move improves the life of the shoe by distributing ground contact over a substantial ground engaging surface of the shoe. The pivotal ability of the shoe furthermore enhances ground sensing, particularly in soft ground conditions.

Providing the sensing shoe with interchangeable wear surfaces which have non-stick, high wear characteristics, reduces service down time and overall costs of the system. Moreover, the non-stick characteristics of the shoe improves operation of the height adjusting system in shedding foreign materials during operation of the harvester.

Numerous other features and advantages of the present invention will become readily apparent from the following detailed description, the accompanying drawings, and the appended claims.

BRIEF DESCRIPTION OF THE DRAWINGS

FIG. 1 is a fragmentary side elevational view of a cotton harvester incorporating principles of the present invention;

FIG. 2 is an enlarged side elevational view of a ground contour sensing assembly according to the present invention;

FIG. 3 is a bottom plan view of the ground contour sensing assembly illustrated in FIG. 2;

FIG. 4 is a rear elevational view of the ground contour assembly with a ground engaging shoe in a canted position to engage a ground surface.

DETAILED DESCRIPTION OF THE PRESENT INVENTION

While the present invention is susceptible of embodiment in various forms, there is shown in the drawings a presently preferred embodiment hereinafter described with the understanding that the present disclosure is to be considered as a exemplification of the invention and is not intended to limit the invention to the specific embodiment of illustrated.

Referring now to the drawings, wherein like reference numerals indicate like parts throughout the several views, there is shown a self-propelled cotton harvester which is depicted only fragmentarily in a scene as represented in its entirety in FIG. 1 by reference numeral 10. Cotton harvester 10 has a fore-and-aft extending frame 12 mounted on a pair of ground engaging front wheels 14. A pair of steerable rear wheels (not shown) provide the harvester with proper direction.

One or more harvesting units 16 are commonly supported at a forward end of frame 12. Each harvesting unit 16 is a conventional structure including a fore-and-aft extending housing assembly 18 which rotatably supports a housing mechanism (not shown) and other associated mechanism for stripping or picking cotton from the plants as the harvester is driven across the field. A pair of stalk lifters 20 extend forwardly from the housing assembly 18 for guiding the cotton plants through a plant passage defined by the housing assembly 18.

A mounting and supporting system, indicated generally by reference numeral 24 in FIG. 1, is provided for supporting the harvesting units for vertical movement between lowered and raised elevational positions. The mounting and supporting system preferably includes a lift assembly 26 and elongated tool bar structure 28 connected to the lift assembly.

U.S. Pat. No. 5,010,718 and entitled "METHOD AND APPARATUS FOR SUPPORTING HARVESTING UNITS OF A COTTON HARVESTER" provides a more detailed explanation of the mounting and supporting system 24 and is incorporated herein by reference. Suffice it to say, the lift assembly 26 operates as a parallelogram type linkage which is pivotally connected to and extends forwardly from frame 12 of the cotton harvester. As illustrated in FIG. 1, lift assembly 26 includes a pair laterally spaced upward tension arms 29 and 30 which extend generally parallel to pair of laterally spaced lower lift arms 32 and 34. The tension arms 28 and 30 have an effective length which is approximately equal to that of the lift arms 32 and 34, respectively, and therefore, the harvesting units connected thereto are maintained in a generally level attitude during field operation as they are moved between lowered and raised elevational positions. The harvesting units are preferably individually connected to the tool bar structure 28 which, as illustrated, is suitably connected to the lift assembly 26.

A pressurized hydraulic system 36 is preferably provided for adjusting the elevation of the harvesting units. As shown on FIG. 1, the hydraulic system 36 includes hydraulic lift means 38 preferably in the form of two linearly distendable hydraulic cylinders. Each hydraulic cylinder is connected between the frame 12 and the harvesting units 16. Each hydraulic cylinder of the hydraulic lift means 38 receives and exhausts hydraulic fluid through conduits 40 and 42.

During harvesting operation, operation of the lift means 38 and thereby the elevation of the harvesting unit is automatically controlled by a height sensing system generally indicated by reference numeral 46. As shown, the height sensing system 46 includes a control valve assembly 48, a ground contour sensor assembly 50, and a linkage assembly 52 interconnecting the valve assembly 48 with the sensor assembly 50.

In the illustrated embodiment the control valve assembly 48 includes a positionable valve 54 which is arranged in combination with the hydraulic system 36. As is conventional, the position of valve 54 regulates the flow of pressurized hydraulic fluid through the conduits 40 and 42 of the hydraulic system to influence operation of the lift cylinders 38 and thereby the elevation of the harvesting units 16.

The linkage assembly 52 is preferably of the type disclosed in co-assigned, and co-pending U.S. Pat. application Ser. No. 07/626,022, filed Dec. 12, 1990. Suffice it to say, linkage assembly 52 includes linkage 56 which extends upwardly from and interconnects the valve 54 of the control valve assembly 48 to the ground contour sensor assembly 50.

The present invention is primarily concerned with the ground contour sensor assembly 50 used to automatically position the control valve assembly 48 and thereby the harvesting units during operation of the harvester. In the preferred embodiment illustrated in FIGS. 2 and 3, the ground contour sensor assembly 50 preferably includes a mounting bracket 58 and a ground engaging shoe 60 connected to bracket 58.

As shown, the mounted bracket 58 is pivotally connected to the harvesting unit to allow vertical movement of the sensor assembly 50 relative thereto. In a most preferred form of the invention, an elongated fastener 61 pivotally attaches mounting bracket 58 between adjacent sidewalls 62 and 64 (FIG. 3) of a stalk lifter 20 and defines a first pivotal mount toward a forward end allowing vertical movement of the ground engaging sensor assembly 50 about first pivot axis 68 (FIG. 3). The bracket 58 extends rearwardly from the fastener 61 and includes an upright leg section 70 which is vertically supported by a brace 72.

An apertured flange 74 extends rearwardly from and is preferably joined to the upright leg section 70 As shown, flange 74 defines fore-and-aft spaced apertures 76 and 78. Either aperture 76, 78 can be used to releasably connect a lower end of linkage 56 and thereby connecting the valve assembly 48 to the ground contour sensing assembly 50.

A salient feature of the present invention is that the ground engaging shoe 60 is provided with a ground engaging surface 80 that is permitted pivotal sideways movement thereby enhancing the ability of the sensor assembly 50 to follow the contour of the ground G (FIG. 4) over which the harvester moves. Shoe 60 is fastened to the mounting bracket 58 at a second pivotal mount defining a second axis extending generally normal to the first axis 68 to allow for horizontal pivoting movement of the ground engaging surface 80.

As shown in FIGS. 2 and 4, shoe 60 preferably includes an upright link section 86 extending generally parallel to and in confronting relation with upright leg section 70 of bracket 58. Suitable fastening means 88 pivotably interconnect the shoe 60 to the bracket 58. As illustrated in FIG. 4, leg section 86 defines a pair of arcuate slots 90 and 92 allowing for fastening means 88 to pass therethrough and pivotly interconnect the shoe 60 to the bracket 58 in a manner allowing for pivotal movement of the ground engaging surface 80 relative to the ground contour. In the illustrated embodiment, the axis about which the shoe 60 horizontal pivots to accommodate changes in ground contour lies midlength of an imaginary line joining the centers of fastening means 88.

As will be appreciated, the fastening means 88 may be used to secure the ground engaging surface 80 in a specific orientation relative to bracket 58. Alternatively, the fastening means 88 can be used to allow the shoe 60 to "float" and readily adapt to changing ground contours over which the harvester moves during the harvesting operation. In either form, the fastening means 88 fasten the shoe 60 to the bracket 58 to allow the disposition of the ground engaging surface 80 to adjust relative to the ground contour.

In a preferred form of the invention, shoe 60 is interchangeable with like shoes and includes an interchangeable wear plate 94 carried thereby and which defines the ground engaging surface 80. The wear plate 94 is preferably fabricated from a non-metallic synthetic material.

During operation of the harvester, harvesting unit elevation is correlated to the extent that sensor assembly 50 vertically moves relative to the harvesting unit. As will be appreciated, vertical movement of sensor assembly 50 will be translated through linkage assembly 52 into movement of valve assembly 48 thereby influencing operation of the hydraulic lift mechanism 36.

As best illustrated in FIG. 4, shoe 60 of the sensor assembly 50 is permitted to pivotally move sidewise thereby enhancing engagement between the ground engaging surface 80 and the ground contour. The ability of the shoe 60 to move sidewise inhibits a lateral edge of the shoe from slicing into the plant bed and distributes the ground engaging force more evenly over the entire ground engaging surface 80 of the shoe 60. As will be appreciated, this enhances ground sensing particularly in soft ground conditions and also prolongs wear life of the shoe at the ground engaging area.

The multiple mounting locations 76 and 78 provided on the mounting bracket 58 allows the linkage 56 to be shifted and thereby mechanically vary ground "sensitivity" to suit the particular field locations involved therewith.

Providing interchangeable wear plates 94 which define the ground engaging surface also enhances performance of the sensing assembly. As will be appreciated, fabricating the wear surface from a non-stick high-wear rate synthetic material reduces the service time and replacement costs involved in such a sensing apparatus. Moreover, the non-stick characteristics of the material improves mud shedding during operation of the harvester and muddy conditions.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A cotton harvester having a fore-and-aft extending wheeled frame with a harvesting unit supported thereon, a pressurized hydraulic system having supply and return portions and lift means for adjusting the elevation of said harvesting unit, and means for controlling operation of said lift means and thereby the elevation of said harvesting unit, said controlling means comprising:

valve means arranged in combination with said hydraulic system for regulating flow of pressurized hydraulic fluid though said supply and return portions to influence operation of said lift means and thereby the elevation of said harvesting unit as a function of the position of said lift means; and ground contour sensing means carried by the harvesting unit for positioning said valve means and thereby operating said lift means to correlate harvesting unit elevations to the extent that said sensing means vertically moves relative to said harvesting unit, said ground contour sensing means including a shoe with a ground engaging surface that is pivotably movable sideways about a fore-and-aft extending axis thereby enhancing ground contact of said shoe with the ground contour.

2. The cotton harvester according to claim 1 further including fastening means for fastening said shoe in a canted sideways position to enhance the position of said ground engaging surface relative to the ground contour.

3. The cotton harvester according to claim 1 wherein said shoe is removably interconnected to said harvesting unit to be interchangeable with like shoes and has a non-metallic ground engaging surface.

4. A cotton harvester having a fore-and-aft extending frame with a harvesting unit supported thereon for vertical movement, hydraulic lift means connected between said frame and said harvesting unit for adjusting the elevation of said harvesting unit, and means for controlling operation of said lift means and thereby the elevation of said harvesting unit, said controlling means comprising:

valve means for controlling operation of said hydraulic lift means thereby effecting elevation of said harvesting unit as a function of said valve means position; and ground contour sensing means carried by said harvesting unit for positioning said valve means to cause the lift means to effect harvesting unit elevation correlated with the extent that said sensing means vertically moves relative to said harvesting unit, said ground contour sensing means including a shoe with a ground engaging surface connected to and moving said valve means in response to vertical movement of said sensing means, said shoe further including a pivot mount permitting sideways pivotal movement of said shoe about a fore-and-aft extending axis thereby enhancing contact of said shoe with said ground surface.

5. The cotton harvester according to claim 4 wherein said shoe is fabricated from a synthetic material to improve wear characteristics thereof.

6. The cotton harvester according to claim 4 wherein said shoe is fastened to a mounting bracket with fastening means for pivotably adjusting said ground engaging surface about said fore-and-aft extending axis and relative to the ground surface.

7. The cotton harvester according to claim 6 wherein said mounting bracket defines fore-and-aft spaced apertures, either of said apertures being adapted to accommodate linkage connecting said ground contour sensing means to said valve means.

8. Ground contour sensing assembly adapted for use with a harvesting unit of a cotton harvester, said sensing assembly comprising:
 a mounting bracket defining a first pivotal mounting arranged toward a forward end thereof to allow for vertical movement of said bracket about a first axis; and
 a ground engaging shoe which carries an interchangeable wear plate defining a ground engaging surface for said shoe, said shoe being connected to said mounting bracket at a second pivotal mount defining a second axis extending generally normal to said first axis to allow for horizontal pivotal movement of said ground engaging surface thereby enhancing ground contact of said surface with changing ground contours.

9. The ground contour sensor assembly according to claim 8 wherein said ground engaging shoe is attached to said mounting bracket by fastening means defining the second axis allowing for horizontal pivotal movement of said shoe.

* * * * *